(12) United States Patent
Ohtake et al.

(10) Patent No.: US 8,974,712 B2
(45) Date of Patent: Mar. 10, 2015

(54) METHOD OF MANUFACTURING RADOME

(75) Inventors: Shinichi Ohtake, Yokohama (JP); Hiroshi Seto, Chigasaki (JP)

(73) Assignee: Faltec Co., Ltd., Kanagawa-Ken (JP)

( * ) Notice: Subject to any disclaimer, the term of this patent is extended or adjusted under 35 U.S.C. 154(b) by 0 days.

(21) Appl. No.: 12/861,933

(22) Filed: Aug. 24, 2010

(65) Prior Publication Data
US 2011/0047784 A1    Mar. 3, 2011

(30) Foreign Application Priority Data

Aug. 28, 2009   (JP) ................................ 2009-199040

(51) Int. Cl.
B29C 45/14   (2006.01)
H01Q 1/42   (2006.01)

(52) U.S. Cl.
CPC ..................................... H01Q 1/42 (2013.01)
USPC ....................................................... 264/255

(58) Field of Classification Search
CPC ............................... B29C 45/14; B29C 45/16
USPC ....................................... 264/255, 259, 328.1
See application file for complete search history.

(56) References Cited

U.S. PATENT DOCUMENTS

| | | | |
|---|---|---|---|
| 6,961,023 B2 * | 11/2005 | Fujii et al. ..................... | 343/713 |
| 2005/0062660 A1 | 3/2005 | Henderson et al. | |
| 2005/0168374 A1 * | 8/2005 | Kamiya et al. .................... | 342/1 |
| 2007/0098967 A1 | 5/2007 | Ido et al. | |
| 2007/0117380 A1 * | 5/2007 | Ido et al. ........................ | 438/653 |

FOREIGN PATENT DOCUMENTS

| | | |
|---|---|---|
| EP | 1635187 | 3/2006 |
| JP | 200049522 | 2/2000 |
| JP | 2000159039 | 6/2000 |
| JP | 2002212324 | 7/2002 |
| JP | 2004251868 | 9/2004 |
| JP | 2007013722 | 1/2007 |
| JP | 2007138270 | 6/2007 |
| JP | 2008024254 | 2/2008 |
| JP | 2008195161 | 8/2008 |

OTHER PUBLICATIONS

Office Action issued in corresponding Chinese Application No. 201010265987.1 dated Jun. 20, 2013.

* cited by examiner

Primary Examiner — Larry Thrower
Assistant Examiner — Xue Liu
(74) Attorney, Agent, or Firm — Hoffmann & Baron, LLP

(57) ABSTRACT

A method of manufacturing a radome, which is provided on a detection side of a radar for detecting an obstacle in a vicinity of a vehicle, includes a first forming step of forming a transparent member that includes a recess on one surface thereof; an first installing step of installing a bright member, which has a shape corresponding to a space in the recess and of which a contact surface coming into contact with an inner surface of the recess has brilliance, in the recess; and a second installing step of installing a base member that covers the one surface and integrally holds the transparent member and the bright member.

7 Claims, 6 Drawing Sheets

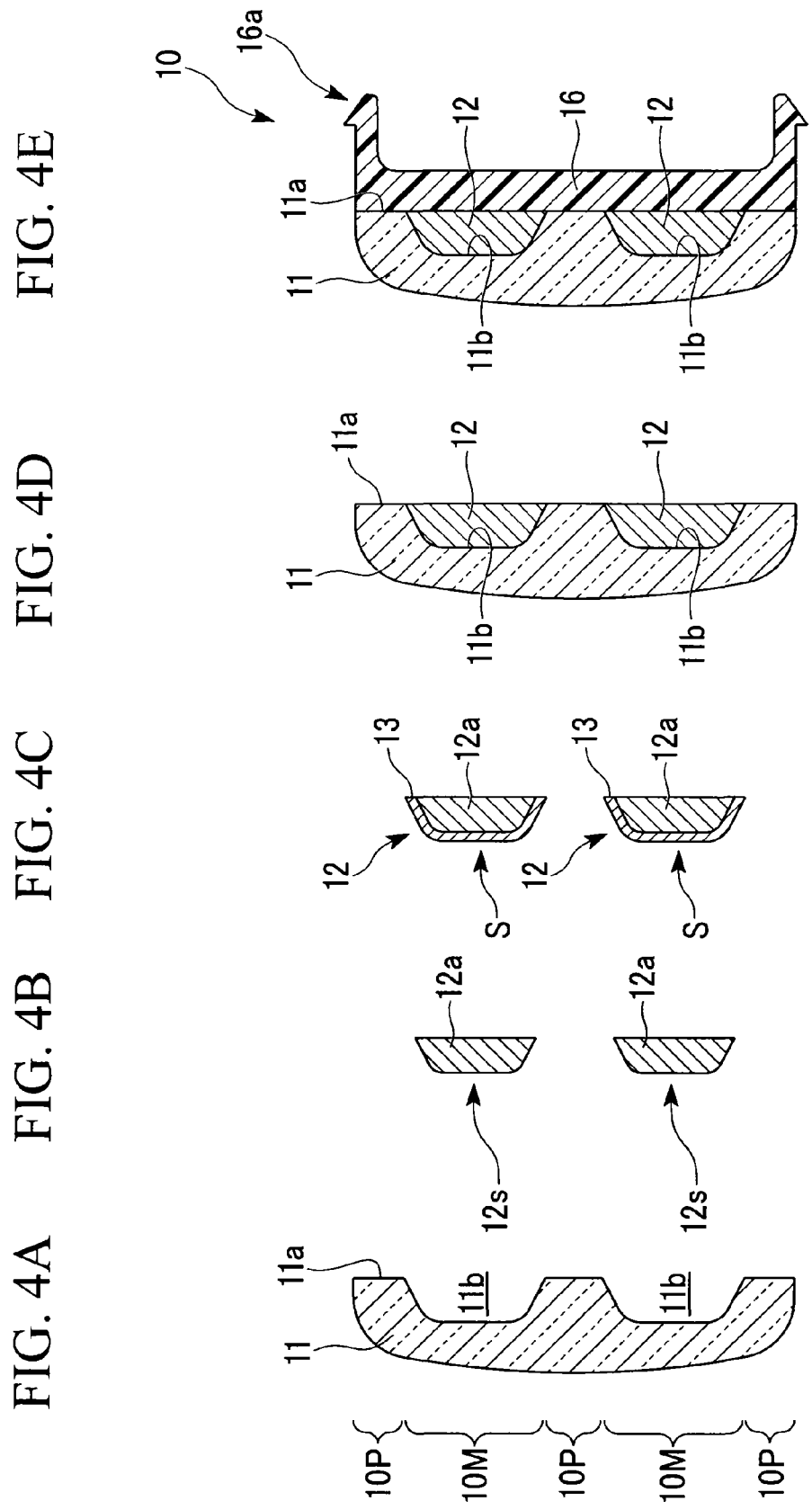

METHOD OF MANUFACTURING RADOME

Priority is claimed on Japanese Patent Application No. 2009-199040, filed on Aug. 28, 2009, the contents of which are incorporated herein by reference.

BACKGROUND OF THE INVENTION

1. Field of the Invention

The present invention relates to a method of manufacturing a radome disposed on the detection side of a radar that is mounted on a vehicle and detects an obstacle in the vicinity of the vehicle.

2. Description of the Related Art

In recent years, there has been a millimeter wave radar that is mounted on a vehicle and measures a distance or relative speed between the vehicle and an obstacle by detecting the obstacle in the vicinity of the vehicle by using a radio wave. A radiator grill made of a synthetic resin is provided on the detection side of the radar. An identification mark such as an emblem is provided in the middle of the radiator grill. A bright metal surface such as chrome plating is generally formed on a general radiator grill, emblem, or the like in order to provide a high quality feeling or texture. However, it is known that chrome plating prevents the transmission of radio waves. For this reason, there has been proposed a radar where an opening for transmitting radio waves is formed at a central portion of the radiator grill and a radome, which has metallic brilliance and is formed so as to transmit radio waves, is provided at the opening (for example, refer to Japanese Unexamined Patent Application, First Publication No. 2000-49522 and Japanese Unexamined Patent Application, First Publication No. 2000-159039).

Here, in the above-mentioned Patent Documents, there is disclosed a radome that includes recesses, a deposition layer or a sputtered layer, and a resin layer. The recesses are formed on the back surface of a transparent resin layer (a surface facing a radar). The deposition layer or a sputtered layer is made of indium and is formed at the recesses as a metal layer having metallic brilliance. The resin layer includes protrusions corresponding to the recesses and is formed on the back surface of the transparent resin layer so that the thickness of the radome is substantially constant. The radome has metallic brilliance that does not cause an uncomfortable feeling even though the radome is disposed together with the radiator grill, and radio wave transmittance that is enough for the radar to detect an obstacle.

However, there are the following problems in the related art.

A coating film (a so-called base coating and top coating) or a colored layer is formed on the transparent resin layer of the above-mentioned radome by a coating step, a printing step, or the like. The coating film is provided to protect a metal layer that is formed by deposition or sputtering. The colored layer has a function as a mask that forms only the recesses as a bright metal surface. Further, the resin layer, which makes the thickness of the radome substantially constant, is formed on the surface of the transparent resin layer, on which the metal layer or the colored layer is formed, by injection molding.

A plurality of steps, such as a coating step and an injection molding step, other than a deposition step or a sputtering step, is required to form the radome as described above. Since these manufacturing steps are troublesome, certain defective products are generated. For this reason, there has been a problem in that it is difficult to suppress the rate of generation of defective products due to the reduction of the yield of products in all manufacturing steps.

In particular, since the metal layer, the coating film, or the like is damaged by injection pressure and the heat of a melted resin in the injection molding step, many defects such as indentation or peeling of a metal layer and a coating film have been generated.

The present invention has been made in consideration of the above-mentioned circumstances, and an object of the present invention is to provide a method of manufacturing a radome that can reduce the labor hours or the cost required to manufacture the radome by reducing the number of manufacturing steps and suppressing the rate of generation of defective products.

SUMMARY OF THE INVENTION

The present invention adopts the followings in order to solve the problem and thus achieve the associated object.

(1) According to an aspect of the present invention, there is provided a method of manufacturing a radome that is provided on a detection side of a radar for detecting an obstacle in a vicinity of a vehicle. The method includes a first forming step of forming a transparent member that includes a recess on one surface thereof; an first installing step of installing a bright member, which has a shape corresponding to a space in the recess and of which a contact surface coming into contact with an inner surface of the recess has brilliance, in the recess; and a second installing step of installing a base member that covers the one surface and integrally holds the transparent member and the bright member.

With the method of manufacturing the radome according to (1) above, the bright member has brilliance. Accordingly, a layer for making the transparent member have brilliance, a protective layer for protecting the layer, and the like do not need to be formed. For this reason, the number of steps of manufacturing the radome is reduced. As a result, the yield of products in all manufacturing steps is improved and the rate of generation of defective products is suppressed.

Further, since the bright member is formed in the shape having a thickness that corresponds to a space in the recess and the base member is provided on the surface of the bright member opposite to the contact surface in the second installing step, the contact surface having brilliance are hardly damaged.

(2) The method according to (1) above may further include a second forming step of forming the bright member before the first installing step. The second forming step may include a step of forming a bright member body that has a shape corresponding to the space in the recess, and a step of performing metal deposition on a surface of the bright member body corresponding to the inner surface of the recess.

In the case of (2) above, a metal layer is formed on the surface of the bright member body by metal deposition. The second forming step of forming the bright member and the formation of the transparent member may be performed in parallel. For this reason, it may be possible to reduce the time that is required to manufacture the radome.

(3) In the method according to (1) or (2) above, the second installing step may include a step of disposing the transparent member, where the bright member is installed in the recess, in a mold, and forming the base member by injection molding.

In the case of (3) above, injection pressure and the heat of the melted resin are applied to the bright member during the injection molding. In this case, the bright member is formed in the shape that has a thickness corresponding to a space in the recess. Further, a melted resin is injected to the surface of the bright member opposite to the contact surface. Accordingly, the contact surface, which has brilliance, of the bright member is hardly damaged.

(4) In the method according to (3) above, the base member may have a color, and the transparent member and the base member may be welded to each other on the one surface in the second installing step.

In the case of (4) above, the transparent member and the base member are welded to each other on the one surface. Accordingly, an adhesive or the like does not need to be provided between the transparent member and the base member. Moreover, since the base member may have a color, the color of a portion except for the recesses becomes the color of the base member when the transparent member is seen from the side opposite to the one surface. Accordingly, a colored layer does not need to be provided.

(5) In the method of (1) or (2) above, the transparent member and the bright member may be bonded to the base member by an adhesive in the second installing step.

In the case of (5) above, the previously formed base member is bonded to the transparent member and the bright member by the adhesive. Accordingly, the transparent member or the bright member is not damaged. Further, the labor hours or cost, which are required to manufacture the radome, are reduced as compared to when the base member is formed by injection molding.

(6) The method according to (3) or (5) above may further include a step of forming a colored layer on the one surface before the first installing step after the first forming step.

In the case of (6) above, even though the base member has a color, it may be possible to adjust the color of a portion except for the recesses, when the transparent member is seen from the side opposite to the one surface, by forming the colored layer on the one surface.

BRIEF DESCRIPTION OF THE DRAWINGS

FIGS. 4A to 4E are schematic views illustrating a method of manufacturing the radome 10 according to the first embodiment.

DETAILED DESCRIPTION OF THE INVENTION

A method of manufacturing a radome according to an embodiment of the present invention will be described below with reference to FIGS. 1 to 8. Meanwhile, in each drawing used for the following description, the scale of each member will be appropriately changed such that each member has a recognizable size. Further, an arrow F in each drawing indicates a forward direction.

First Embodiment

The structure of a radome 10 according a first embodiment of the present invention will be described with reference to FIGS. 1 to 3B.

Figure 1:
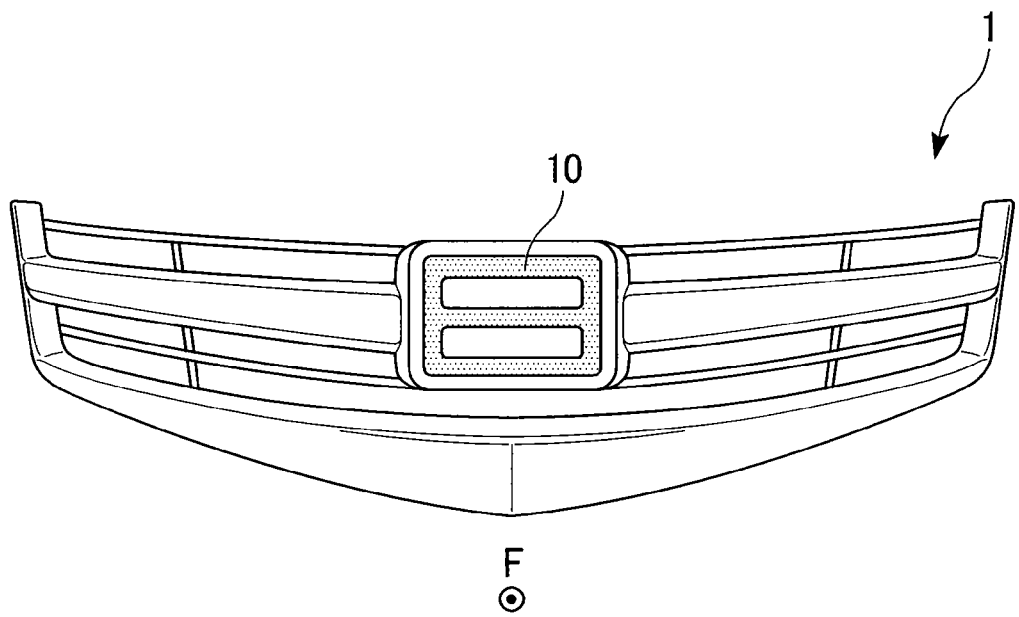
FIG. 1 is a front view of a radiator grill 1 on which a radome 10 according to a first embodiment of the present invention is mounted.

FIG. 1 is a front view of a radiator grill 1 on which the radome 10 according to this embodiment is mounted.

Figure 2:
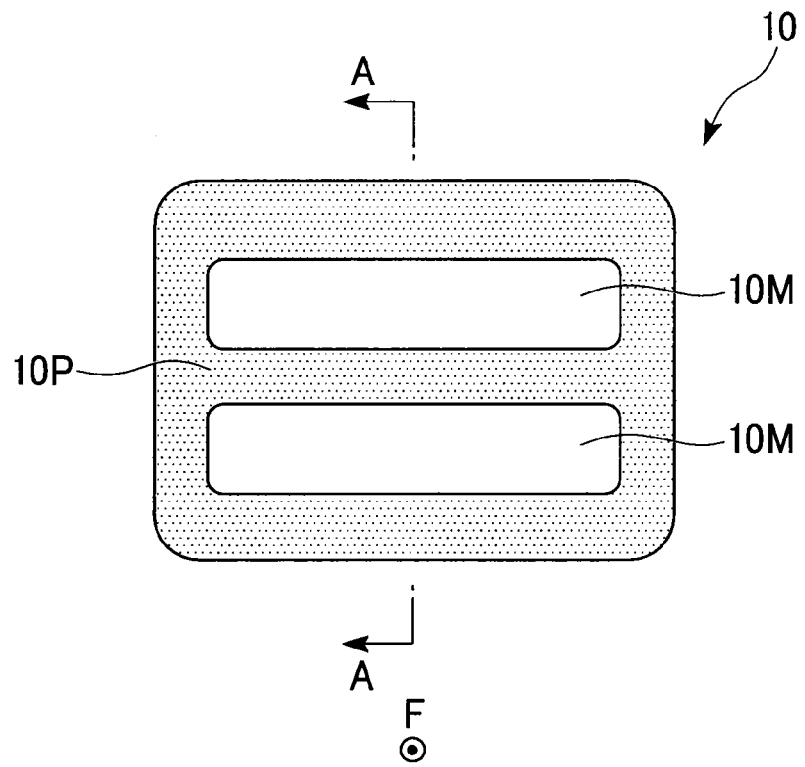
FIG. 2 is a front view of the radome 10 according to the first embodiment.

FIG. 2 is a front view of the radome 10 according to this embodiment.

Figure 3A:
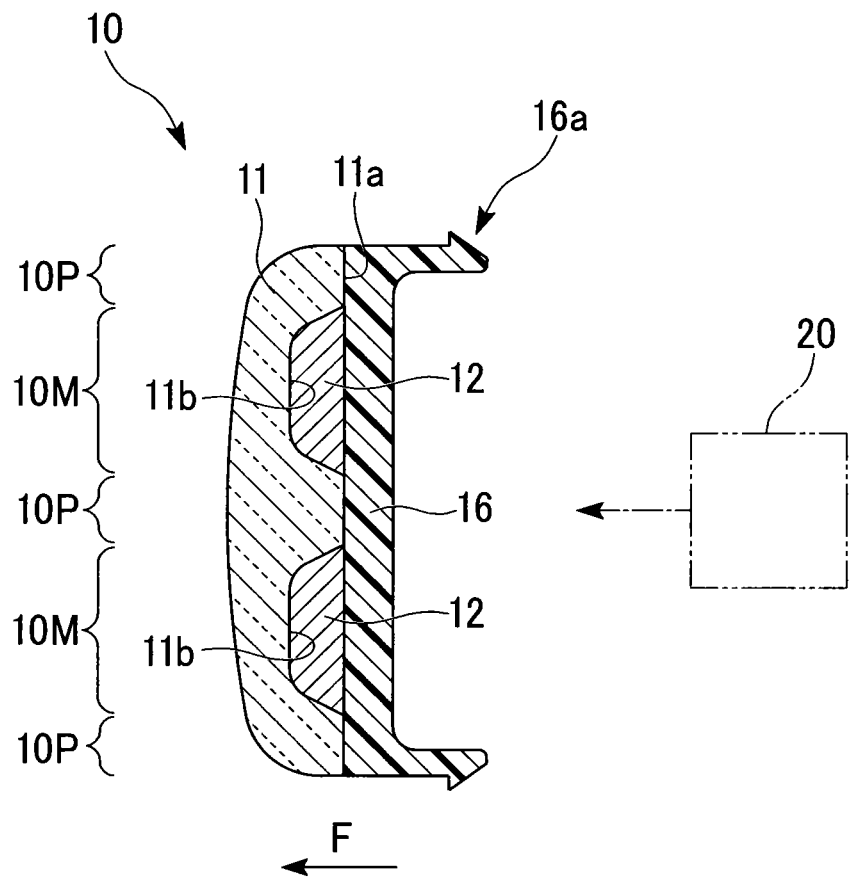
FIGS. 3A and 3B are cross-sectional views taken along a line A-A of FIG. 2.
Figure 3B:
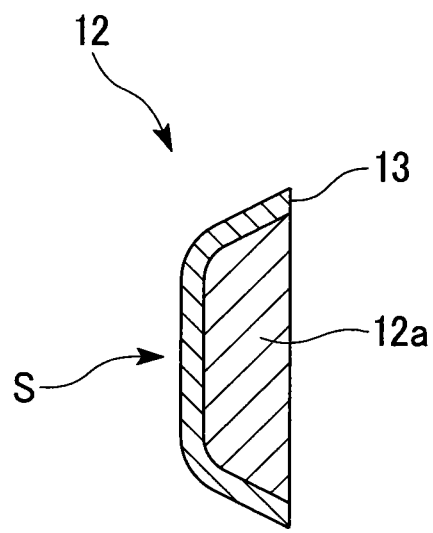

FIG. 3A is a cross-sectional view of the radome 10 taken along a line A-A of FIG. 2. FIG. 3B is an enlarged view of a bright member 12 shown in FIG. 3A.

As shown in FIG. 3A, the radome 10 according to this embodiment is disposed on the detection side of a radar 20 that is mounted on a vehicle and detects an obstacle in the vicinity of the vehicle by using a radio wave. Meanwhile, in the following description, the surface of the radome 10 facing the radar 20 is referred to as a back surface, and the surface of the radome 10, which faces the front side of a vehicle on the side opposite to the back surface, is referred to as a front surface. Further, the detection side of the radar 20 means a direction where the radar 20 emits a radio wave. That is, the radome 10 is disposed so that a radio wave emitted from the radar 20 is transmitted through the radome 10.

The structure of the radiator grill 1 on which the radome 10 is mounted will be described first with reference to FIG. 1.

The radiator grill 1 is a vehicle component that is provided on the front surface of the vehicle, and includes a plurality of members extending in a horizontal direction and a plurality of members extending in a vertical direction that are integrated with each other. Further, the radome 10 is provided in the middle of the front surface of the radiator grill 1. Meanwhile, the radar 20 is installed on the back side of the radome 10 (see FIG. 3A).

The radar 20 is mounted on the vehicle and detects an obstacle in the vicinity of the vehicle by using a radio wave. Specifically, the radar measures a distance, relative speed, and the like between the vehicle and an obstacle positioned on the front side of the vehicle.

Furthermore, the radar 20 includes a transmitter and a receiver. The transmitter emits a radio wave (millimeter wave) having a frequency in the range of 76 GHz to 77 GHz, that is, a frequency that is applied to a radar for detecting an inter-vehicle distance. The receiver receives a radio wave reflected from an obstacle. Meanwhile, when the radio wave emitted from the radar 20 is transmitted through the radome 10, the attenuation of a radio wave occurs. The attenuation needs to be suppressed as much as possible so that the radar 20 stably operates and correctly measures a distance between a vehicle and an obstacle.

The structure of the radome 10 will be described below with reference to FIGS. 2, 3A, and 3B.

As shown in FIG. 2, the radome 10 is a member that is provided on the detection side of the radar 20 (see FIG. 3A) and is formed in the shape of a substantially rectangular plate, and includes metal portions 10M and a colored portion 10P when seen from the front side. Each of the metal portions 10M has metallic brilliance, and the colored portion 10P is colored, for example, black. The metal portions 10M are provided at two positions in the radome 10, and extend in the horizontal direction so as to be parallel to each other. Further, an emblem or the like of a vehicle is formed of the metal portions 10M.

The colored portion 10P is provided at an area of the radome 10 except for the metal portions 10M.

As shown in FIGS. 3A and 3B, the radome 10 includes a transparent member 11, bright members 12, and a base member 16.

The transparent member 11 is a plate-like member that has a substantially rectangular shape when seen from the front side. The transparent member 11 is made of a transparent synthetic resin, such as PC (polycarbonate) or PMMA (polymethyl methacrylate), and is formed by injection molding or the like. The thickness of the transparent member 11 is in the range of about 1.5 mm to 10 mm. Hard coating or clear coating of urethane-based paint, which is to prevent damage, is performed on the front surface of the transparent member 11. Meanwhile, if the transparent member 11 is made of a transparent synthetic resin having scratch resistance, these coating processes for preventing damage do not need to be performed. Recesses 11b are formed on a back surface (one surface) 11a of the transparent member 11 at positions corresponding to the metal portions 10M. Bright members 12 to be described below are installed in the recesses 11b, and the recesses 11b make the metal portions 10M be seen three-dimensionally when the radome 10 is seen from the front side.

Each of the bright members 12 is formed in the shape corresponding to the recess 11b, and is installed in the recess 11b. Contact surfaces S of the bright members 12, which come into contact with the inner surface of the recess 11b, have metallic brilliance. Each of the bright members 12 includes a bright member body 12a and a bright layer 13.

The bright member body 12a is formed in the shape corresponding to the recess 11b. The bright member body 12a is made of a synthetic resin, such as ABS (acrylonitrile butadiene styrene), PC (polycarbonate) or PET (polyethylene terephthalate), and is formed by injection molding or the like. The bright member body 12a is formed so as to be substantially flush with the back surface 11a of the transparent member 11 when being installed in the recess 11b.

The bright layer 13 is a layer that makes each of the contact surfaces S of the bright members 12 have metallic brilliance. The bright layer 13 includes a metal layer that is formed by metal deposition, and a base coating layer and a top coating layer (not shown) that protect the metal layer. A vacuum deposition method or sputtering is used as the metal deposition. Indium, aluminum, tin, or the like is used as the metal to be deposited. A base coating layer and a top coating layer are to protect a thin brittle metal layer that is formed by deposition. Each of the base coating layer and the top coating layer is formed by clear coating that uses a transparent synthetic resin (which may be a colored transparent synthetic resin). Since being very thin, the metal layer of the bright layer 13 has radio wave transmittance enough for the radar 20 to detect an obstacle.

Meanwhile, the bright layer 13 of this embodiment has been formed by metal deposition, but a method of forming the bright layer 13 of this embodiment is not limited thereto. The bright layer 13 may be formed by other methods in addition to the coating that makes the bright layer 13 have sufficient radio wave transmittance and metallic brilliance.

The base member 16 covers the back surface 11a of the transparent member 11, integrally holds the transparent member 11 and the bright members 12, and is used to mount the radome 10 on the radiator grill 1. The base member 16 is made of a synthetic resin, such as ABS, AES (acrylonitrile ethylene styrene), PBT (polybutylene terephthalate), PC, or PET, or composite resins thereof. The thickness of the base member 16 is in the range of about 0.5 mm to 10 mm. Further, the base member 16 has a color (black or the like). The color of the base member 16 is the same as the color of the colored portion 10P of the radome 10. Meanwhile, a plurality of mounting pieces 16a, which is to be connected to the radiator grill 1, is formed on the back surface of the base member 16.

The base member 16 is formed by injection molding. In more detail, the base member 16 is formed by so-called insert molding that performs injection molding while the transparent member 11 where the bright members 12 are installed in the recesses 11b is disposed in a mold for injection molding. Meanwhile, a hot melted resin comes into contact with the back surface 11a of the transparent member 11 during the formation of the base member 16. For this reason, the transparent member 11 is slightly melted on the back surface 11a. Accordingly, after the formation of the base member 16, the transparent member 11 and the base member 16 are welded to each other on the back surface 11a. As a result, it may be possible to join the transparent member 11 to the base member 16 without using an adhesive or the like.

Subsequently, a method of manufacturing the radome 10 according to this embodiment will be described with reference to FIGS. 4A to 4E.

FIGS. 4A to 4E are schematic views illustrating the method of manufacturing the radome 10 according to this embodiment.

The method of manufacturing the radome 10 includes a first forming step of forming the transparent member 11, a second forming step of forming the bright members 12, a first installing step of installing the bright members 12 in the recesses 11b, and a second installing step of installing the base member 16 on the back surface 11a of the transparent member 11 while forming the base member 16.

Each of the steps will be described below.

The transparent member 11 is formed first as shown in FIG. 4A.

The transparent member 11 is formed by injection molding, and the recesses 11b are formed on the back surface 11a thereof. Meanwhile, the back surface 11a and the inner surfaces of the recesses 11b are formed of smooth surfaces. Further, hard coating is performed on the front surface of the transparent member 11 in order to prevent damage by improving durability against friction or the like.

After that, the bright members 12 are formed as shown in FIGS. 4B and 4C.

First, each of the bright member bodies 12a is formed by injection molding or the like. Then, the bright layer 13 is formed on the surface 12s of each of the bright member bodies 12a corresponding to the inner surfaces of the recesses 11b. The bright layer 13 is formed by sequentially laminating the base coating layer, the metal layer, and the top coating layer on the bright member body 12a. Each of the base coating layer and the top coating layer is formed by clear coating that uses a transparent synthetic resin. The metal layer is formed by metal deposition.

The bright layer 13, which makes each of the metal portions 10M of the radome 10 have metallic brilliance, is formed on the bright member body 12a in this embodiment. For this reason, it may be possible to form of the bright members 12 and the transparent member 11 in parallel. Accordingly, it may be possible to reduce the time that is required to manufacture the radome 10.

After that, the bright members 12 are installed in the recesses 11b as shown in FIG. 4D. Meanwhile, the bright layers 13 are omitted in FIG. 4D and FIG. 4E to be described below.

The bright members 12 are installed in the recesses 11b of the transparent member 11. In this case, the contact surfaces S of the bright members 12 come into contact with the inner surfaces of the recesses 11b without a gap.

Finally, the base member 16 is formed as shown in FIG. 4E.

The transparent member 11 where the bright members 12 are installed in the recesses 11b is disposed in a mold for injection molding, and the base member 16 is formed by performing insert molding that injects a melted resin to the back surface 11a of the transparent member 11. Since covering the back surface 11a, the base member 16 can integrally hold the transparent member 11 and the bright members 12. Meanwhile, the transparent member 11 is slightly melted on the back surface 11a due to the heat of the melted resin. For this reason, after the base member 16 is formed, the transparent member 11 and the base member 16 are welded to each other on the back surface 11a. Accordingly, it may be possible to join the transparent member 11 to the base member 16 without using an adhesive or the like.

Further, a color (black or the like) resin is used as a resin that is used to form the base member 16. Accordingly, after the base member 16 is formed, the color of the base member 16 is the same as the color of the colored portion 10P of the radome 10. For this reason, a colored layer or the like, which forms the color of the colored portion 10P does not need to be formed on the back surface 11a.

Furthermore, injection pressure and the heat of the melted resin are applied to the bright members 12 during the injection molding of the base member 16. Each of the bright members 12 is formed in the shape that has a thickness corresponding to a space in the recess 11b, and a melted resin is injected to the surface of the bright member 12 opposite to the contact surface S (bright layer 13) of the bright member 12. Accordingly, the bright layer 13 of the bright member 12 is hardly damaged.

The manufacture of the radome 10 according to this embodiment is completed as described above.

Since the bright members 12 include the bright layers 13 if the radome 10 is manufactured by the above-mentioned method, each of the bright members 12 has brilliance. For this reason, a metal layer for making the transparent member 11 have brilliance, a base coating layer and a top coating layer for protecting the metal layer, and the like do not need to be formed, the number of the steps of manufacturing the radome 10 are reduced. As a result, the number of the steps of manufacturing the radome 10 is reduced, so that the yield of products in all manufacturing steps is improved and the rate of generation of defective products is suppressed.

Accordingly, according to this embodiment, it may be possible to obtain the following advantages.

According to this embodiment, it may be possible to reduce the number of the steps of manufacturing the radome 10 and to suppress the rate of generation of defective products. Accordingly, it may be possible to obtain an advantage of reducing the labor hours or cost that are required to manufacture the radome 10.

Second Embodiment

The structure of a radome 10A according to a second embodiment of the present invention will be described with reference to FIG. 5. Meanwhile, in FIG. 5, the same components as those of the first embodiment shown in FIGS. 3A and 3B are represented by the same reference numerals, and description thereof will be omitted.

Figure 5:
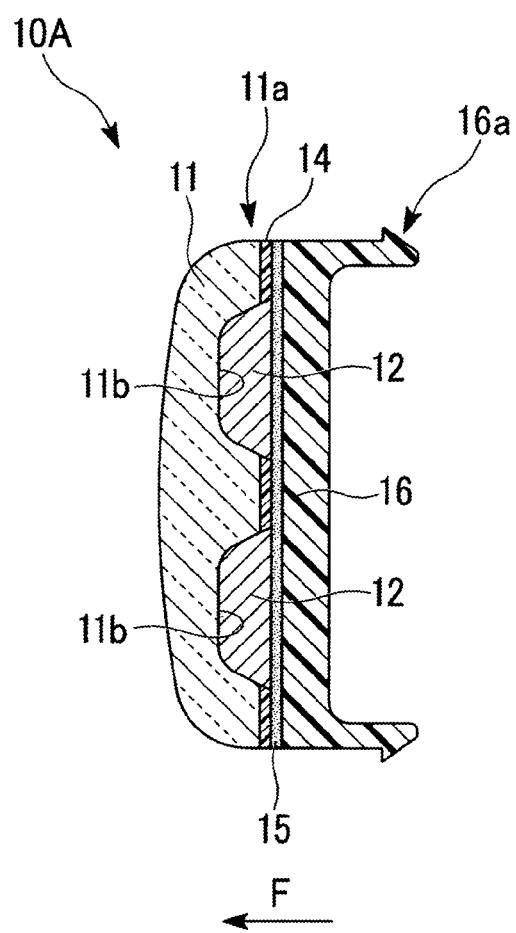
FIG. 5 is a cross-sectional view of a radome 10A according to a second embodiment of the present invention.
Figure 6:
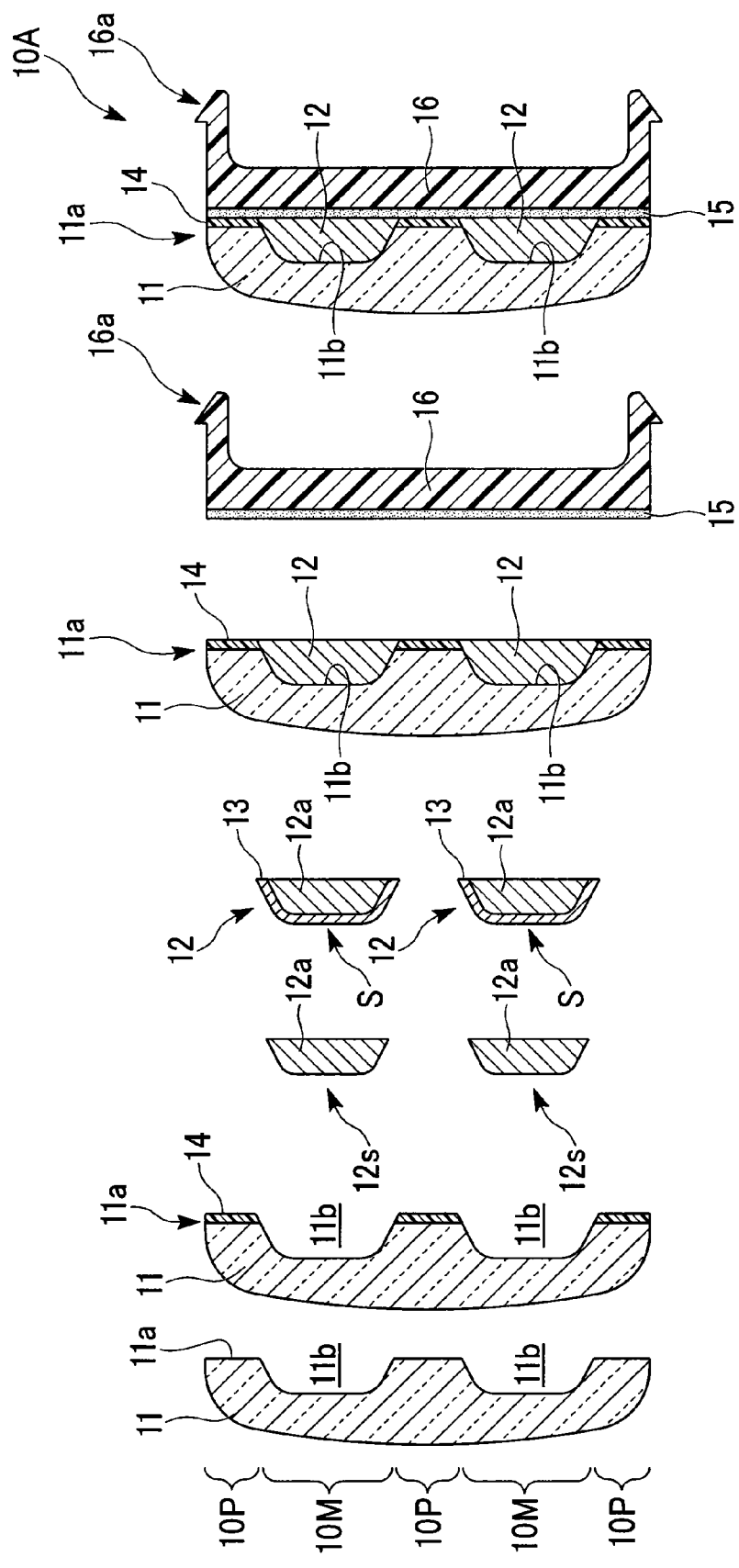
FIGS. 6A to 6G are schematic views illustrating a method of manufacturing the radome 10A according to the second embodiment.

FIG. 5 is a cross-sectional view of the radome 10A according to this embodiment.

A colored layer 14 corresponding to black or the like, which adjusts the color of the colored portion 10P of the radome 10A, is formed on the back surface 11a of the transparent member 11. The colored layer 14 is formed by silk screen printing, hot stamp, pad printing, or the like.

An adhesive 15 is disposed between the transparent member 11 and the bright members 12, and the base member 16. That is, the transparent member 11 and the bright members 12 are bonded to the base member 16 by the adhesive 15. An adhesive or a pressure sensitive adhesive, which bonds an object by being hardened from the form of a liquid or gel, a double-sided tape, or the like, is used as the adhesive 15.

Subsequently, a method of manufacturing the radome 10A according to this embodiment will be described with reference to FIGS. 6A to 6G. Meanwhile, the description of the same steps as those of the first embodiment will be omitted in the following description.

FIGS. 6A to 6G are schematic views illustrating the method of manufacturing the radome 10A according to this embodiment.

The method of manufacturing the radome 10A includes a first forming step of forming the transparent member 11, a step of forming the colored layer 14 on the transparent member 11, a second forming step of forming the bright members 12, a first installing step of installing the bright members 12 in the recesses 11b, a step of forming the base member 16 and applying the adhesive 15 to the base member 16, and a second installing step of installing the base member 16 on the back surface 11a of the transparent member 11 by the adhesive 15.

The transparent member 11 is formed first as shown in FIG. 6A.

After that, the colored layer 14 is formed as shown in FIG. 6B.

The colored layer 14 is formed on the back surface 11a of the transparent member 11. In this case, the colored layer 14 is not formed on the inner surfaces of the recesses 11b. The colored layer 14 is formed by silk screen printing, hot stamp, pad printing, or the like. It may be possible to adjust the color of the colored portion 10P of the radome 10A by forming the colored layer 14.

After that, the bright members 12 are formed as shown in FIGS. 6C and 6D.

Then, the bright members 12 are installed in the recesses 11b as shown in FIG. 6E. Meanwhile, the bright layers 13 are omitted in FIG. 6E and FIG. 6G to be described below.

Subsequently, the base member 16 is formed and the adhesive 15 is applied as shown in FIG. 6F.

First, the base member 16 is formed by injection molding or the like. Then, the adhesive 15 is applied to the surface of the base member 16, which is bonded to the transparent member 11. An adhesive or a pressure sensitive adhesive, which bonds an object by being hardened from the form of a liquid or gel, a double-sided tape, or the like, is used as the adhesive 15 of this embodiment.

Finally, as shown in FIG. 6G, the base member 16 is bonded to the back surface 11a of the transparent member 11 by the adhesive 15.

Since covering the back surface 11a, the base member 16 can integrally hold the transparent member 11 and the bright members 12. Further, in this embodiment, the previously formed base member 16 is bonded to the transparent member 11 and the bright members 12 by the adhesive 15. Accordingly, the transparent member 11, or the bright members 12, particularly, the bright layers 13 are not damaged. Furthermore, labor hours or cost, which are required to manufacture the radome 10A, are reduced as compared to when the base member 16 is formed by injection molding.

The manufacture of the radome 10A according to this embodiment is completed as described above.

Accordingly, according to this embodiment, it may be possible to obtain the following advantages.

According to this embodiment, it may be possible to obtain an advantage of adjusting the color of the colored portion 10P of the radome 10A by the colored layer 14 and an advantage of reduce the labor hours or cost, which are required to manufacture the radome 10A, as compared to when the base member 16 is formed by injection molding.

Further, according to this embodiment, the bright member 12 is smaller than the transparent member 11. Accordingly, as compared to when a transparent portion is decorated, it may be possible to further reduce loss when defectives are generated in a decorating step.

Furthermore, according to this embodiment, the structure of the bright member 12 is simple. Accordingly, it may be possible to further reduce the time that is required to perform molding and decoration. Therefore, it may be possible to perform the formation and decoration of the bright members 12 and the transparent member 11 in parallel, and to reduce the number of the steps of manufacturing the radome 10A.

The embodiments of the present invention have been described above with reference to the drawings. However, the present invention is not limited to the embodiments. The shapes, the combinations, and the like of the respective components, which are shown in the above-mentioned embodiments, are illustrative, and may be modified in various ways based on the demand for design without departing from the scope of the invention.

For example, the base member 16 has been formed by insert molding in the first embodiment, but a method of forming the base member 16 is not limited thereto. The base member 16 may be formed by so-called two-color molding (double molding) or DSI molding (Die Slide Injection molding). In the two-color molding (double molding) or DSI molding (Die Slide Injection molding), the bright members 12 are installed in the recesses 11b while the formed transparent member 11 is disposed in a mold, the base member 16 continues to be molded while only a mold for the base member 16 is exchanged. According to this method, it may be possible to further reduce the number of the steps of manufacturing the radome 10.

Moreover, in the first embodiment, the transparent member 11 and the base member 16 have come into direct contact with each other and have been directly welded to each other on the back surface 11a. However, the present invention is not limited to this structure. A modification of the radome 10 shown in FIG. 7 may be employed.

Figure 7:
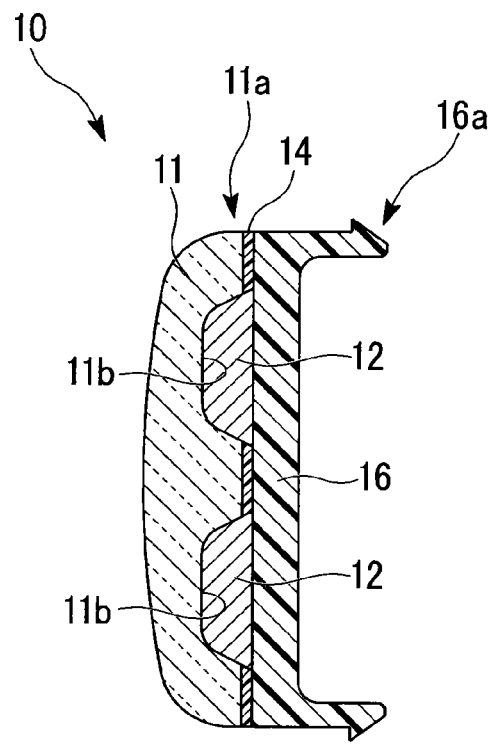
FIG. 7 is a schematic view showing a modification of the radome 10 according to the first embodiment of the present invention.

As shown in FIG. 7, a colored layer 14 is formed on a back surface 11a of a transparent member 11 in order to adjust the color of a colored portion 10P of the radome 10. Meanwhile, if it is not possible to secure a sufficient joining force between the transparent member 11 and the base member 16 by forming the colored layer 14, an adhesive (not shown in FIG. 7) may be provided between the transparent member 11 and the base member 16.

Further, in the second embodiment, the plurality of mounting pieces 16a, which is to be connected to the radiator grill 1, has been formed at the base member 16. However, the present invention is not limited to this structure. A modification of the radome 10A shown in FIG. 8 may be employed.

Figure 8:
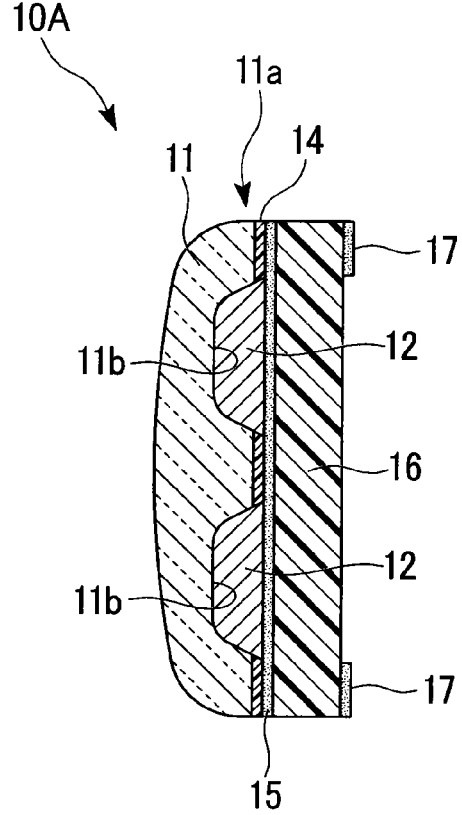
FIG. 8 is a schematic view showing a modification of the radome 10A according to the second embodiment of the present invention.

As shown in FIG. 8, a second adhesive 17 is provided instead of the mounting pieces 16a and the radome 10 is connected to the radiator grill 1 by the second adhesive 17. Meanwhile, second adhesive 17 may be applied to the radome 10 according to the first embodiment.

Furthermore, in the above-mentioned embodiments, the radome 10(10A) has been mounted on the radiator grill 1. However, the present invention is not limited to this structure. As long as the radome 10(10A) is provided on the detection side of the radar 20, the radome 10(10A) may be provided on, for example, a bumper or the like of a vehicle.

While the preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A method of manufacturing a radome that is provided on a detection side of a radar for detecting an obstacle in a vicinity of a vehicle, the method comprising:
   a first forming step of forming a transparent member that includes a recess in one surface thereof, said recess being defined by an inner surface;
   a second forming step of forming a bright member body having a first surface and an opposite second surface, the bright member body being made of resin, performing metal deposition on the first surface of the bright member body to form a bright layer having a contact surface corresponding in size and shape to the inner surface of the transparent member recess, said bright member body and said bright layer together forming a bright member, the bright member having a thickness corresponding to a depth of the recess formed in the transparent member and further having the contact surface and the second surface;
   a first installing step of installing the bright member in the recess after the first and second forming steps, wherein, the contact surface of the bright member comes into contact with the inner surface of the recess such that the second surface of the bright member is substantially flush with said one surface of the transparent member; and
   a second installing step of installing a base member that covers the one surface of the transparent member and the second surface of the bright member and integrally holds the transparent member and the bright member.

2. The method of manufacturing a radome according to claim 1, wherein the second installing step includes a step of disposing the transparent member, where the bright member is installed in the recess, in a mold for injection molding, and forming the base member by injection molding.

3. The method of manufacturing a radome according to claim 2, wherein the base member has a color, and the transparent member and the base member are welded to each other on the one surface in the second installing step.

4. The method of manufacturing a radome according to claim 1, wherein, in the second installing step, the transparent member and the bright member are bonded to the base member by an adhesive.

5. The method of manufacturing a radome according to claim 2, further comprising:
   a step of forming a colored layer on the one surface before the first installing step after the first forming step.

6. The method of manufacturing a radome according to claim 4, further comprising:
   a step of forming a colored layer on the one surface before the first installing step after the first forming step.

7. The method of manufacturing a radome according to claim 1, wherein the bright member and the transparent member are formed in parallel.

* * * * *